May 11, 1965  E. SCHLUETER  3,183,030

FASTENING CLIP

Filed May 24, 1963

INVENTOR.
Ernest Schlueter
BY
AGENT

3,183,030
FASTENING CLIP
Ernest Schlueter, 74 Edwards Road, Troy, N.Y.
Filed May 24, 1963, Ser. No. 282,983
5 Claims. (Cl. 292—303)

This invention relates to clips or fastening devices and more particularly to such fastening devices which snap into locking engagement after a forced spreading, by a keeper, of a slotted member having a detent on one or more sides of the slot.

More particularly, the invention relates to one-piece fasteners in which a keeper is forced into a seat, and removable therefrom, and held in such seat by one or more detents under force by a spring.

An object of the invention is to provide a fastener of this type in the form of a one-piece stamping from cheap sheet stock, such as cold rolled (not heat treated) steel or aluminum.

Another object is to provide a fastener of this type from stock having a comparatively low limit of elasticity but which may have high rigidity so as to avoid permanently distorting the fastener.

Another object is to provide a fastener of this type from such cheap material that the fastener may contain enough bulk of the material so that there is little liability of the fastener becoming distorted other than during the seating or withdrawal of the keeper.

Another object is to provide a fastener of this type in which a torsion spring is employed to urge a detent into fastening position.

These and other objects easily recognizable from the description, are attained in connection with a fastener, for a keeper, including a body of relatively thick sheet or strip material having an angular bend to provide a substantially flat base and flange projecting therefrom. An open-ended flaring slot in the flange, transverse to the bend line, extends thereacross to divide off a movable but integral portion of the base as well as a portion of the flange. Movement of the divided off portion of the flange in its own plane twists the corresponding portion of the base as a torsion spring. The flared part of the slot includes a keeper seat, and detent means is provided on the flange adjacent the seat.

In the accompanying drawing showing, by way of example several of many possible embodiments of the invention, FIG. 1 is a perspective of one form of the fastener shown in connection with a bottom front right corner of a refrigerator;

Figure 1:
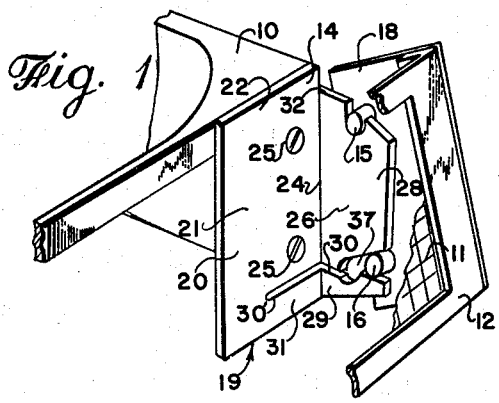
Figure 2:
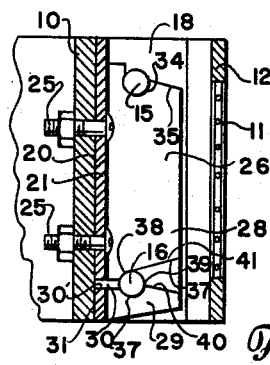
FIG. 2 is a sectional view showing the fastener of FIG. 1 holding a grill on the refrigerator.

One form of the invention is shown in FIGS. 1 and 2 in connection with a lower right front corner portion 10 of a refrigerator for the mounting of a grill 11 held fast in a frame 12.

Such grills are in conventional use for preventing objects on the floor from being pushed under the refrigerator and the grills must be removable to facilitate cleaning of the floor upon which the refrigerator rests and for other reasons. The refrigerator corner portion as shown is somewhat schematic and the grill and frame are only illustrative.

The fastener 14 receives two spaced inwardly projecting keeper studs 15 and 16 fast on a stiff plate 18 on which the frame 12 is mounted substantially fast.

The fastener 14 comprises a one-piece bent stamping 19 of relatively stiff material, described more fully below, having a flat base part 20 secured fast at its mid and upper zones 21 and 22 near the vertical bend line 24, as by bolts 25, to the refrigerator corner portion on the front thereof. Projecting forward from the base part 20 at the bend line is a divided flange 26 having a stiff upper section 28 and divided from a lower section much less in height by an open-end horizontal slit or slot 30. This slit not only extends to the bend line 24 but on into base below the lower of the bolts 25 as at 30' to leave an unsecured, movable yet integral, part 31 of the base 20 carrying the lower section 29. The part 31 is sometimes hereinafter termed a torsion spring.

The top edge portion 32 of the section 26 is provided with a U-shaped recess 34 down in which the keeper stud 15 may be disposed, the edge portion being beveled down toward the front as at 35 so that rearward motion of the stud causes it to ride upwardly for falling into the recess.

The forward mouth of the slot 30 flares as a notch 37 to receive the lower stud 16 as the plate 18 and frame are swung about the axis of the upper stud 15 in the recess 34. The seat of the notch is circular in form as at arcuate lower and upper edges 36 and 38 so as to embrace about half the circumference of the stud 16. There is a slight detent hump 39 on the lower section 29 of the flange, between the arcuate edge 39 and the camming edge 40 of the lower edge of the notch. The seat of the notch and the stud 16 are so proportioned that when the stud 16 enters the notch the stud usually first cams on edge 40 which slightly tends to lower relatively the upper section 28 down from the upper stud 15. But next the notch upper edge 41 begins to bear on the stud so that final seating occurs after the stud 16 has passed the hump 39 by bending the lower section 29 downwardly.

The stud 16 is held resiliently in the seat by the detent and there is slight play between the upper stud 15 and its recess 34.

The material of the fastener may be varied considerably. A fastener of $\frac{1}{16}$ inch cold rolled (not heat treated) SAE 1020 steel sheet is satisfactory if base part 31 is $\frac{3}{4}$ inch long (the length of slot 30' in the base) and $\frac{1}{4}$ inch wide and the distance from the detent hump 39 to the bend line is about $\frac{1}{2}$ inch, with the detent having an effective height of about 0.015 inch.

In the operation of the fastener, substantially all of the "give" during insertion and removal of the stud 16 appears to be due to the base part 31 acting as a torsion spring. The strength of the spring action varies, of course, with the length of slot portion 30' and width and thickness of the part 31. There may be bending of the base part in line with the slot 30' but this is only slight and not necessary to the action of the fastener.

The part 31 as a torsion spring enables the use of heavy material, and which may have a low elastic limit, to give required ruggedness and strength. Resilient holding means for grills have heretofore been of expensive heat treated thin strip, with the result that they have often been sprung out of shape so as to prevent a precise mounting.

While cheap cold rolled sheet steel has been found satisfactory for grill fasteners the invention is not limited to this material. Almost any material such as metals and plastics that have any detectable degree of elasticity may be used, though the material should have enough rigidity so that the fastener maintains its intended shape.

Figures 3, 4, 5:
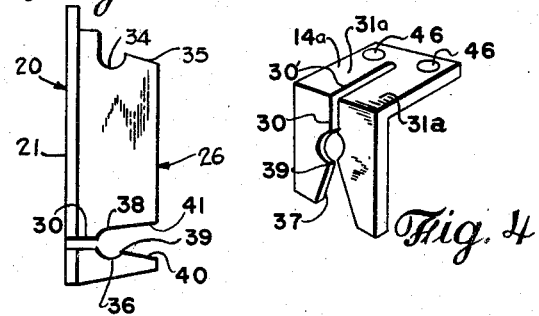
FIG. 3 is a side elevation of the fastener of FIGS. 1 and 2.
FIG. 4 is a perspective of another form of the invention.
FIG. 5 shows the fastener of FIG. 4 as a bracket.
Figure 7:
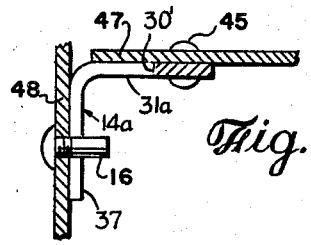
FIG. 7 is a front elevation of the clasp in FIG. 6.

Another form of the invention is shown in FIG. 4 wherein a right angle bracket clip 14a has a notch 37 with detent 39 and slots 30 and 30' as described in FIGS. 1 to 3, except for the slots being in somewhat medial position so as to give two torsion springs at 31a. The clip mounted rear of the slot 30', as by rivets 45 passing through holes 46, on, say a plate 47. This form of the invention is especially desirable when the plate 47 is light in weight and must be held in place on a wall carrying the stud 16. The bracket clip is of aluminum about 0.050 inch thick, with the slot 30' about ¾ inch long, and the torsion springs 31a each about ½ inch wide. A widening of the notch at the detent 39, about ½ inch from slot 30', of at least 1/32 inch is possible without permanent deformation. Under such conditions about 3 lbs. of force in the direction of slot 30 was required to free the clip from the stud, exclusive of any weight. An almost equal force was required to seat the stud. The shape of the detent 39, of course, determines the snap-in and pull-out forces.

Figure 6:
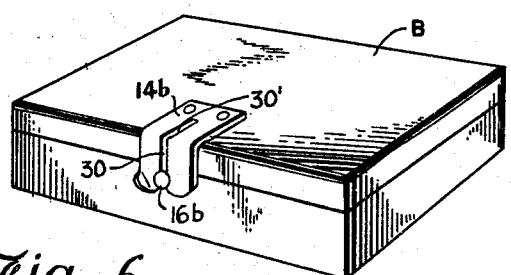
FIG. 6 shows another form of the fastener as a box lid clasp.
Figure 8:
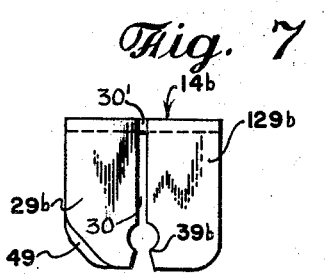
FIG. 8 is a sectional view of the clasp on the box of FIG. 6.

The fastener 14b as used for a lid clasp on a box or case B in FIG. 6 is quite similar to the bracket clip of FIG. 4 except that the flange sections 29b and 129b carry detents 39b of the same shape to distribute the spring action equally between the torsion springs. This is desirable when the lid fits telescopically over a part of the box proper, so that there be no tendency to cause any lateral motion of the lid. The stud 16 is modified by the provision of head 16b and the flange section 29b is provided with an outwardly turned ear 49. The ear serves as a thumb piece for the right thumb to push upwardly on when the forefinger presses downwardly on the stud head, in a somewhat wingnut turning, to raise the fastener from the stud. The flange section 129b terminates in flatter form so as not to project near the fingers.

Figure 9:
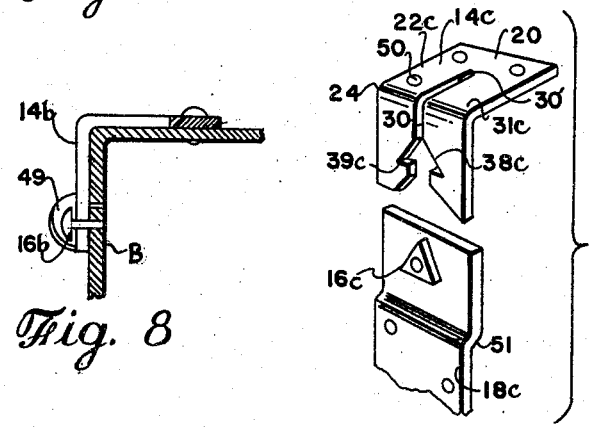
FIG. 9 shows the fastener with modified shape of the seat and keeper.

The seat and detent humps have been shown to accommodate a stud or round keeper so that the keeper may be withdrawn when necessary by various degrees of force. For the fastener 14c of FIG. 9, the keeper 16c is arrowhead or triangular in shape for being forced into a somewhat similarly shaped seat 38c having detents 39c which in fact lock the keeper in so that the latter cannot normally be withdrawn. The form of the invention shown in FIG. 9 may be used on, say, inside corners of mitered joints. The fastener can be unlocked by inserting a screw driver in the slot 30, then giving the former a turn to twist the spring 31c. A mounting-screw hole 50 near the bend line 24 enables the substantially rigid mounting of the fastener on the material to be joined. The keeper plate 18c may be offset, as at 51, for inside corners and the plate may be reversed for outside corners.

Figure 10:
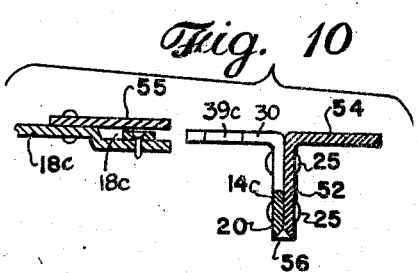
FIG. 10 shows still another form of use of the fastener.

While fasteners of this general type are especially adapted for use near a 45° corner or edge, the base of fastener, say, 14c may be mounted on a flange 52 of a sheet or strip 54 for in-line connection of the latter with the keeper plate or strip 18c as shown in FIG. 10. A retainer member 55 on the keeper strip 18c prevents off-setting disconnection. With some materials and under light loads, the fastener and the strip 54 may be integral at the common edge 56 as a result of forming the fastener blank as part of the strip 54 and then providing the 180° and two 90° bends, so as to eliminate the need for bolts 25.

In all forms of usage it is to be understood that the torsion spring portions of the base are free to be twisted slightly. For example, in FIG. 9, spring 31c is not to be secured to the fastened structure as may be its corresponding part 22c. In certain extreme instances shims under the base proper may be necessary.

While as pointed out above, the angle at the bend line 24 is preferably about 90°, the angle need not be this amount. Greater deviation reduces the effective depth of the slot 30 and to compensate for this the slot 30' is usually lengthened.

The invention claimed is:

1. A clasp for a container lid comprising an elongated plate of slightly elastic material and transversely bent at substantially right angles provided with medial open-ended slot in one of the resulting legs to form two sections, the slot extending partially into the other leg, the open end of the slot having a mouth of generally circular shape to form a seat for a keeper and provide a pair of opposite detent members, near the end of the first mentioned leg, one of said sections terminating as an outwardly turned ear remote from the slot and seat as a thumb lift piece for use in somewhat wing nut fashion when a stud-like keeper is detained in the keeper seat.

2. A fastener device for a refrigerator grill wherein the grill has keeper means including first and second parallel round studs fast with respect to the grill and projecting in the same direction, said device comprising a base of slightly resilient metal provided with a flange projecting at right angles therefrom, said flange having a U-shaped recess in a marginal portion thereof for one of the studs to be disposed and turn in, said flange having an open-ended slot flaring as a notch to receive the second stud as the keeper means turns upon the first, said slot extending continuously from the flange into said base to divide off a portion thereof as a torsion spring, and detent means fast on the flange at the notch for projecting into the path of the second stud to cause spreading of the slot in the flange against the force of the torsion spring.

3. A fastener device for a refrigerator grill wherein the grill has keeper means including first and second parallel round studs fast with respect to the grill and extending in the same direction, said device comprising a substantially right angularly bent plate of slightly elastic material having a base for being secured to a refrigerator and having a substantially perpendicular flange, an end portion of said flange being provided with an open-ended slot extending past the bend line well into the base to divide off a portion of the flange as a lower section and a portion of the base as a torsion spring, the torsion spring being free at the bend line to turn slightly with respect to the remainder of the base, the upper end of the flange opposite the slotted end portion being sloped in the direction from the bend line toward the slot and provided with an upwardly open U-shaped recess extending generally in the same direction as the bend line to receive the first stud for pivotal turning of the keeper means about the first stud, said lower section of the flange having a ramp-like edge and a partially circular seat at the inner end of the ramp-like edge and remote from the bend line to receive the second stud when the first stud is in the U-shaped recess, for the torsion spring and second section of the flange to urge the lower stud in a direction substantially parallel with the planes of the base and flange, said ramp-like edge meeting the seat at an angle to form a detent projecting into the path of the second stud as the keeper means turns on the first stud in the U-shaped recess.

4. A combination as claimed in claim 3, said flange having an abutment adjacent said seat for engagement with the second stud to prevent motion of the second stud past the seat when the second stud enters the seat from the ramp-like edge.

5. A combination as claimed in claim 3, said plate being of non-heat treated steel of order of 1/16 inch thick.

References Cited by the Examiner

UNITED STATES PATENTS

| | | | |
|---|---|---|---|
| 456,636 | 7/91 | Perry | 24—224 |
| 599,699 | 3/98 | Gates | 24—224 |
| 2,179,307 | 11/39 | Sywert | 292—303 |
| 2,186,905 | 1/40 | Laubenstein | 292—87 X |
| 2,898,173 | 8/59 | Squire | 312—138 X |
| 2,960,361 | 11/60 | Boutelle | 292—17 |

DONLEY J. STOCKING, *Primary Examiner.*